United States Patent
Missiaggia et al.

(10) Patent No.: US 11,460,074 B2
(45) Date of Patent: Oct. 4, 2022

(54) SEALING DEVICE FOR WHEEL HUB ASSEMBLY

(71) Applicant: Aktiebolaget SKF, Gothenburg (SE)

(72) Inventors: Giorgio Missiaggia, Trieste (IT); Antonia Nastasi, Turin (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 16/932,073

(22) Filed: Jul. 17, 2020

(65) Prior Publication Data

US 2021/0025495 A1 Jan. 28, 2021

(30) Foreign Application Priority Data

Jul. 24, 2019 (IT) .................. 102019000012744

(51) Int. Cl.
*F16C 33/72* (2006.01)
*F16C 33/76* (2006.01)
(Continued)

(52) U.S. Cl.
CPC ........ *F16C 33/723* (2013.01); *B60B 27/0073* (2013.01); *F16C 33/586* (2013.01); *F16C 33/768* (2013.01); *F16C 33/7886* (2013.01); *F16C 2226/74* (2013.01); *F16C 2326/02* (2013.01)

(58) Field of Classification Search
CPC .... F16C 33/723; F16C 33/586; F16C 33/768; F16C 33/7886; F16C 2326/02; F16C 2226/74; B60B 27/0073
See application file for complete search history.

(56) References Cited

U.S. PATENT DOCUMENTS 3,519,316 A 7/1970 Gothberg et al.
8,888,372 B2 * 11/2014 Ciulla ................ B60B 27/0073
384/448
(Continued)

FOREIGN PATENT DOCUMENTS

EP 2752590 7/2014
EP 2881261 7/2015
(Continued)

OTHER PUBLICATIONS

Machine Translation of JP-2012087858-A (Year: 2012).*
International Search Report for corresponding Italian Patent Application No. 201900012744 dated Jun. 17, 2020.

*Primary Examiner* — Alan B Waits
(74) *Attorney, Agent, or Firm* — Reed Smith LLP

(57) ABSTRACT

Sealing device for a wheel hub assembly provided with a rolling bearing, the sealing device being provided with a shield mounted on an outer ring of the bearing and with an annular cylindrical wall having an inner lateral surface mounted on an outer lateral surface of a collar of the outer ring; and with a sealing material fixed to the shield; an annular snap catch being positioned radially inside the cylindrical wall and extending radially from the inner lateral surface through a specified radial thickness so as to be snap-fitted into a circular groove formed on the outer lateral surface of the collar, and the sealing material being positioned behind the catch before the shield is mounted on the outer ring, with a radial overall dimension smaller than the thickness of the catch.

1 Claim, 2 Drawing Sheets

(51) Int. Cl.
  *B60B 27/00*     (2006.01)
  *F16C 33/58*     (2006.01)
  *F16C 33/78*     (2006.01)

(56) References Cited

U.S. PATENT DOCUMENTS

| | | | | |
|---|---|---|---|---|
| 9,016,949 | B2* | 4/2015 | Baratti | B60B 27/0068 384/448 |
| 2005/0026729 | A1* | 2/2005 | Schenk | F16C 33/7896 474/101 |
| 2007/0003177 | A1* | 1/2007 | Yamamoto | B60B 27/0005 384/448 |
| 2014/0193109 | A1* | 7/2014 | Baratti | F16C 41/007 384/448 |
| 2015/0267753 | A1* | 9/2015 | Ciulla | F16C 33/723 384/489 |
| 2019/0070897 | A1* | 3/2019 | Falossi | F16C 33/586 |

FOREIGN PATENT DOCUMENTS

| | | | | |
|---|---|---|---|---|
| JP | 2012087858 A | * | 5/2012 | F16C 33/783 |
| WO | 20100059355 | | 5/2010 | |

* cited by examiner

SEALING DEVICE FOR WHEEL HUB ASSEMBLY

CROSS REFERENCE TO RELATED APPLICATION

This application is based on and claims priority under 35 U.S.C. § 119 to Italian Application No. 102019000012744, filed Jul. 24, 2019, the entire contents of which are incorporated herein by reference.

FIELD

The exemplary embodiments disclosed herein relate to a sealing device for a wheel hub assembly.

BACKGROUND

The exemplary embodiments disclosed herein are particularly, but not exclusively, suitable for the field of wheel hub assemblies for motor vehicles provided with a rolling bearing for a non-driving wheel. In such applications, the inner ring of the bearing is fitted on to the wheel axle and transmits its consequent rotary motion, while the outer ring of the bearing is fitted on to a fixed hub, for example a hub of a suspension of the motor vehicle.

BRIEF DESCRIPTION OF THE DRAWINGS

The exemplary embodiments will now be described with reference to the attached drawings, which show a non-limiting example of its embodiment, in which.

DETAILED DESCRIPTION

Exemplary embodiments disclosed herein relate to non-driving wheels, for example, those not having an axle passing along the axis of the bearing, the corresponding sealing devices have a cup-shaped axially symmetric shape such that they enclose the outer ring of the bearing. Since the outer ring of the bearing is fixed, the devices form a static seal which protect the bearing from any environmental contaminant (water, mud, debris, etc.).

In its most generic shape, the sealing device comprises a substantially cup-shaped metal shield fitted on to a collar of the outer ring of the rolling bearing by means of interference fitting. The shield comprises, in particular, a cylindrical wall whose inner radial surface is coupled by said interference fitting to an outer radial surface of a collar of the outer ring of the bearing, and a frontal annular wall whose inner axial surface is positioned to bear against an outer annular surface of the collar. For the purpose of both retaining the metal shield in position and improving the static sealing capacity, the sealing device further comprises a sealing material or compound placed behind the inner axial surface of the metal shield and compressed axially between the shield and the collar when the latter has been force-fitted.

The configuration of the sealing device of the type described above makes the mounting of the metal shield extremely simple, since the sealing material or compound comes into contact with the collar only when the fitting is practically complete; however, it has been realized that the direct contact between the cylindrical wall of the shield and the collar of the outer ring leads to rapid corrosion of the outer radial surface of the collar, with a consequent loss of sealing capacity of the metal shield. In order to overcome this drawback, in some known solutions for the sealing device, the cylindrical wall of the shield is covered with a rubber-like material, but this arrangement not only makes the operations of assembling the metal shield to the bearing more complicated, since the tearing of the rubber-like material must be avoided during fitting, but also results in a visible conicity of the cylindrical wall of the metal shield on completion of the mounting.

Exemplary embodiments disclosed herein provide a sealing device for a wheel hub assembly provided with a rolling bearing.

The optimization of the components of the sealing device not only confers the advantage of entirely eliminating the conicity of the cylindrical wall, which is wholly beneficial to the static seal to be formed, but also enables the metal shield to be fitted on to the bearing without the need to take excessive precautions.

Figure 1:
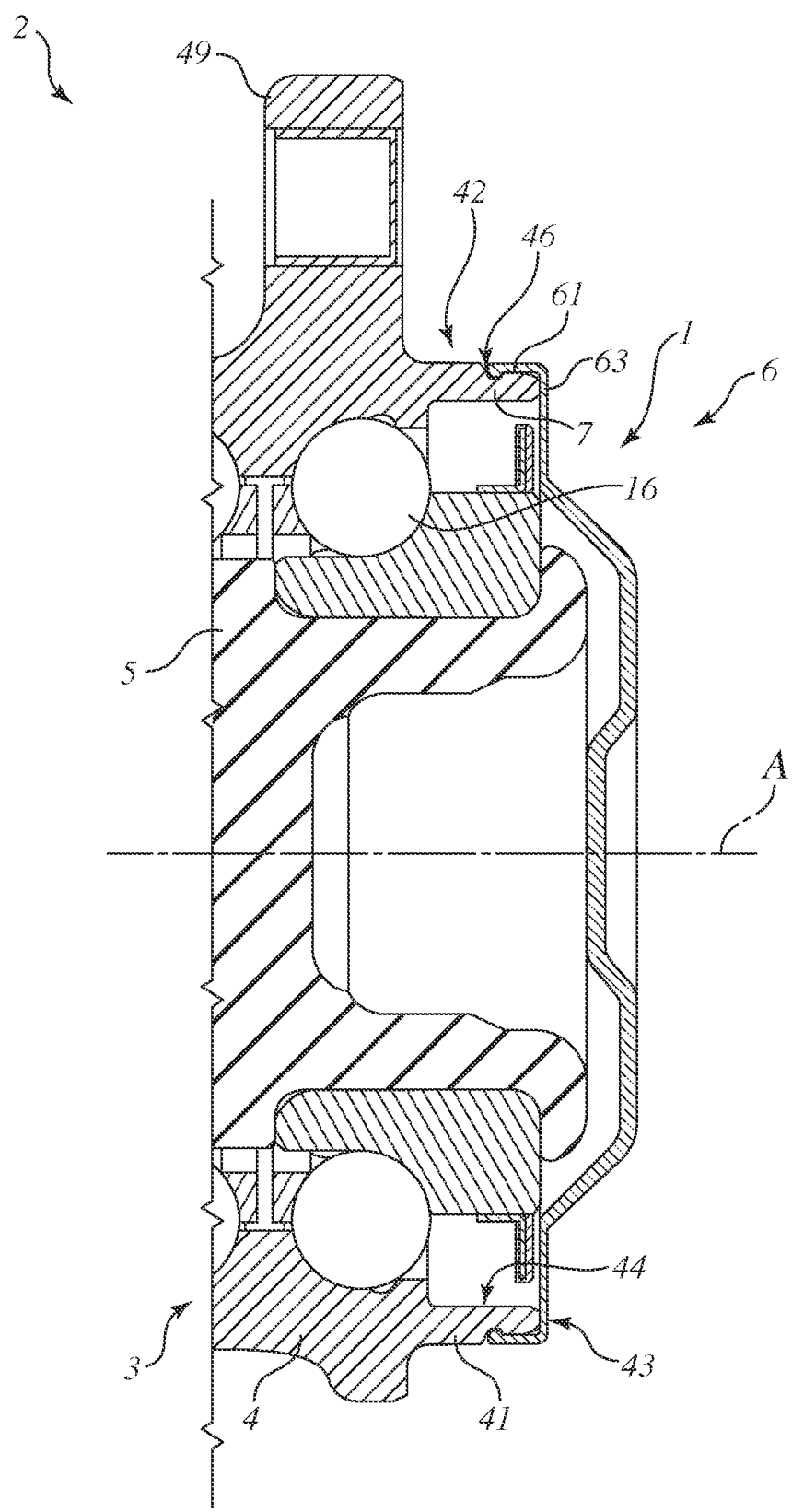
FIG. 1 is a sectional view, with parts removed for clarity, of a preferred embodiment of the sealing device for a wheel hub assembly according to exemplary embodiments.

With reference to FIG. 1, the number 1 indicates the whole of a sealing device for a wheel hub assembly 2.

The assembly 2 is provided with a rolling bearing 3 comprising an outer ring 4, coaxial with an axis A of rotation of the bearing 3 itself, an inner ring 5 coaxial with the outer ring 4, and a plurality of rolling elements 16 interposed between the two rings 4 and 5 to allow the rotation of the inner ring 5 relative to the outer ring 4. In the assembly 2 described here, the inner ring 5 is rotatable to support a vehicle wheel (not illustrated), while the outer ring 4 is stationary and is mounted a cylindrical seat (not illustrated) of an upright of the vehicle (not illustrated). On completion of this mounting, the outer ring 4 of the bearing 3 is a flanged ring comprising a flange 49 transverse to the axis A, and has a collar 41 which extends axially from the flange 49 and is delimited by an outer radial surface 42, by a frontal annular surface 43, and by an inner lateral surface 44.

The collar 41 is the portion of the outer ring 4 on which the fitting of the sealing device 1 takes place, and is the portion of the outer ring 4 that is inserted into the aforesaid upright, and therefore, to allow this insertion at the time when the sealing device 1 is present, the outer radial surface 42 comprises a mounting section 42a near the flange 49 and a fitting section 42b which extends axially beyond the mounting section 42a and has a diameter B of a size smaller than the size of a diameter A of the mounting section 42a. The two sections 42a and 42b are separated from one another by a circular groove 46 having a bottom diameter C of a size smaller than the size of the diameter B.

Figure 2:
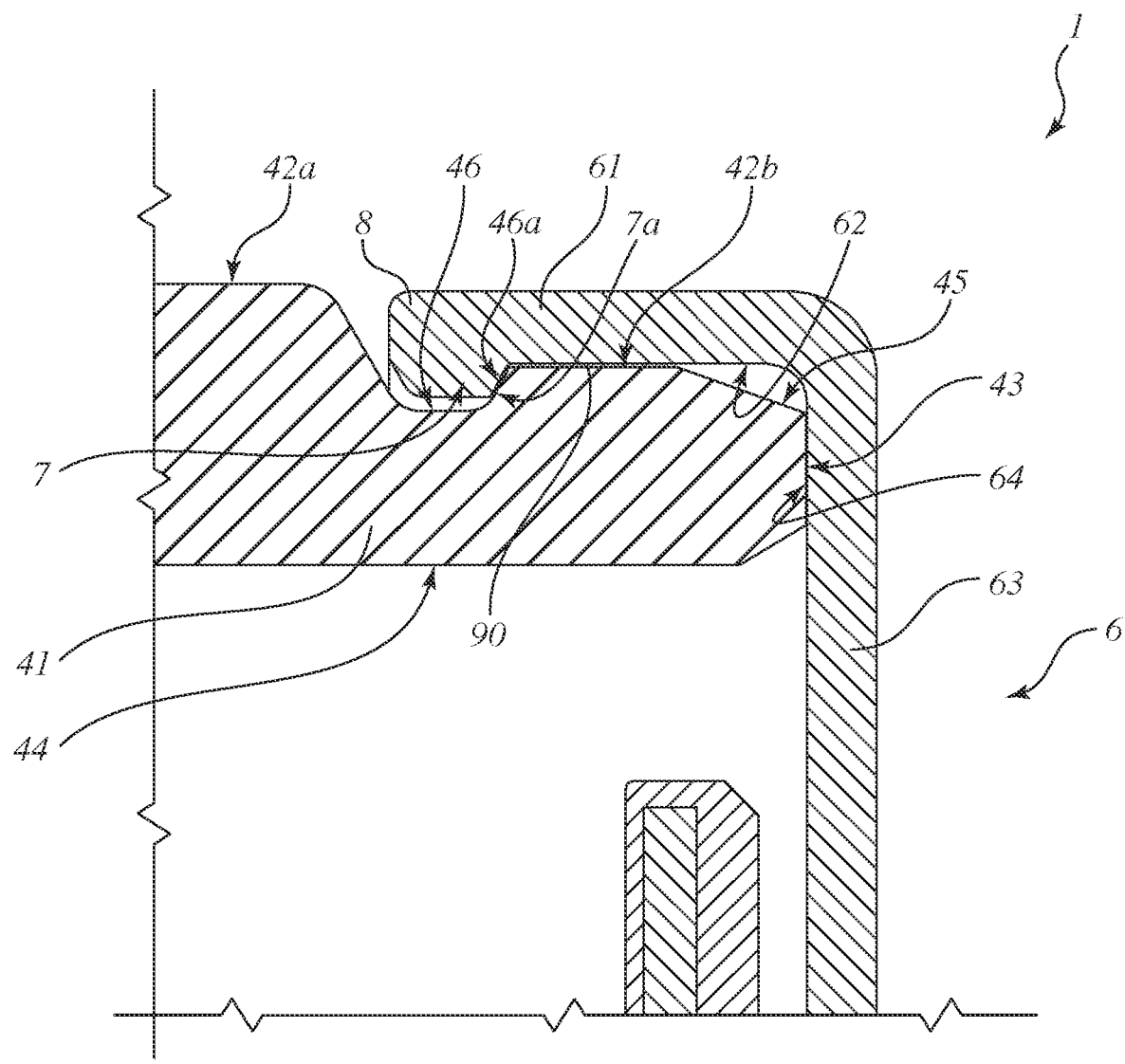
FIG. 2 is a view on an enlarged scale of a detail of the sealing device for a wheel hub assembly of FIG. 1.

The sealing device 1, according to the present invention and with additional reference to FIG. 2, comprises a shield 6 which is mounted on the outer ring 4 of the bearing 3, and which is substantially cup-shaped. The shield 6 is provided with a cylindrical wall 61 having an axial development and provided with an inner lateral surface 62, and with a circular annular wall 63 having a substantially radial development, which is integral with the annular cylindrical wall 61, forms the bottom of the shield 6, and is provided with an inner axial surface 64. The sealing device 1 further comprises an annular snap catch 7, which is positioned radially inside a free end 8 of the cylindrical wall 61 and extends radially towards the axis A from the inner lateral surface 62 through a radial thickness S1 which is preferably, but not necessarily, equal to more than a third of a radial thickness S2 of the cylindrical wall 61. The radial thickness S2 is of a smaller size than the difference between the size of the diameter A of the mounting section 42a and the size of the diameter B of the fitting section 42b.

The axial development of the cylindrical wall 61 is such that an axial distance of the annular snap catch 7 from the inner axial surface 64 is equal to an axial distance of the circular groove 46 from the frontal annular surface 43: thus, when the inner axial surface 64 is positioned to bear against the frontal annular surface 43, the snap catch 7 is housed inside the circular groove 46, and consequently the shield 6 is fixed to the collar 41 in such a way that it cannot be removed, at least involuntarily.

In order to improve the seal of the sealing device 1, and to stabilize the mounting of the shield 6 on the collar 41, the sealing device 1 comprises, finally, a sealing material or compound 90 placed in contact with the inner lateral surface 62 of the cylindrical wall 61 behind the catch 7 and radially compressed between the inner lateral surface 62 of the cylindrical wall 61 and the fitting section 42b of the outer radial surface 42. According to the present invention, the sealing material or compound 90 is positioned, before the sealing device 1 is mounted on the collar 41, in contact with the inner lateral surface 62 in the form of an annular bead having a radial thickness substantially smaller than the thickness S1, immediately behind the catch 7, and this positioning allows two advantages to be gained: firstly, it allows the metal shield 6 to be mounted on the collar 41 without any contact or dispersion of sealing material or compound 90 along the fitting section 42b until the catch 7 is snap-fitted into the groove 46; therefore the sealing material or compound 90 completely seals the interface between the inner lateral surface 62 and the fitting section 42b, starting from the catch 7, thus avoiding the corrosion of the outer radial surface 42 of the collar 41 and any consequent loss of sealing capacity of the metal shield 6.

The thickness S1 of the catch 7 and of the annular bead of sealing material or compound 90 are such that, during the mounting of the sealing device 1, when the catch 7 engages with the section 42b of the surface 42 and is made to slide in contact with the section 42b, the cylindrical wall 61 is deformed within its elastic range, being radially widened, that is to say being radially elevated at the position of the annular bead of sealing material or compound 90, and the annular bead of sealing material or compound 90 is kept distant from, or at least not in contact with, the section 42b, until the catch 7 enters the interior of the groove 46. When the catch 7 has engaged within the groove 46, the elastic return of the cylindrical wall 61 will cause the radial compression of the annular bead of sealing material or compound 90 between the cylindrical wall 61 and the collar 41, with a consequent distribution of sealing material or compound 90 exactly at the entrance of the interface between the inner lateral surface 62 and the fitting section 42b, starting from the catch 7.

To facilitate the elastic deformation of the cylindrical wall 61 and further reduce any possibility of contact of the sealing material or compound 90 with the fitting section 42b, the collar 41 has a chamfer 45 formed along the fitting section 42b between the fitting section 42b and the frontal annular surface 43. The chamfer 45 may have an axial depth, starting from the frontal annular surface 43, which is dependent on the construction material and/or the thickness S2 of the cylindrical wall 61, and which is, in any case, commensurate with the deformation capacity of the cylindrical wall 61 and/or of the thickness S1 of the catch 7.

The catch 7 is engaged within the groove 46 substantially by snap fitting, and, in combination with the sealing material or compound 90, causes the shield 6 to be secured on the collar 41, while also providing, again in combination with the sealing material or compound 90, a leak-tight seal of the sealing device 1 against external contaminants.

For the further improvement of the leak-tight seal of the sealing device 1 relative to external contaminants, the annular snap catch 7 and the circular groove 46 have respective engagement surfaces 7a and 46a which are preferably but not necessarily conical, of which the surface 7a faces towards the frontal annular surface 43, while the surface 46a faces axially in the opposite direction from the frontal annular surface 43. The two surfaces 7a and 46a are engaged with one another to enable the shield 6 to be mechanically retained on the collar 41, and the more closely the inclination of the conicity of the two engagement surfaces 7a and 46a approaches a right angle, the better this mechanical retention and the leak-tight seal of the sealing device 1 will be.

In the above description, the shield 6 is a shield of metallic material, but the innovative solution described above is also applicable in cases where the material of the shield 6 is different, in other words where it is made of plastic and/or similar materials. Similarly, if the material of the shield 6 is different or is made of plastic and/or similar materials, the sealing material or compound 90 deposited on the shield 6 may be replaced by a thermoplastic elastomer co-moulded on to the shield 6 itself.

In addition to the embodiments of the invention as described above, it is to be understood that numerous other variants exist. It is also to be understood that said embodiments are provided solely by way of example and do not limit the object of the invention or its applications or its possible configurations. On the contrary, although the description given above enables those skilled in the art to implement the present invention according to at least one example of its configurations, it is to be understood that numerous variations of the components described may be envisaged without thereby departing from the object of the invention as defined in the appended claims, interpreted literally and/or according to their legal equivalents.

What is claimed:
1. A wheel hub assembly comprising:
   a rolling bearing, wherein the rolling bearing comprises an inner ring; and an outer ring having a collar, wherein the collar has a circular groove formed on an outer lateral surface of the collar, and wherein the collar further has a chamfered surface between the outer surface and a frontal annular surface; and
   a sealing device, wherein the sealing device comprises:
   a circular annular wall;
   an annular cylindrical wall extending axially from a circumference of the circular annular wall;
   a first radially internal surface defined by the annular cylindrical wall facing axially inward of the annular cylindrical wall and extending axially for a first length of the annular cylindrical wall;
   a second radially internal surface defined by the annular cylindrical wall facing axially inward of the annular cylindrical wall and extending axially for a second length of the annular cylindrical wall, the second radially internal surface axially proximate to the circular annular wall and the first radially internal surface axially distal to the circular annular wall;
   a first radius defined by the first radially internal surface;
   a second radius, greater than the first radius, defined by the second radially internal surface; and a sealing material disposed circumferentially upon the second radially internal surface, the sealing material defining a radial dimension that is less than the difference between the second radius and the first radius;

wherein the second radially internal surface and the circular groove have respective engagement surfaces which are conical;

wherein the sealing material seals an interface between the second radially internal surface and the outer lateral surface, wherein the sealing material is configured to be distributed from the conical respective engagement surfaces of the second radially internal surface and the circular groove to the chamfer; and wherein the conical respective engagement surfaces and the chamfer are free from the sealing material.

* * * * *